United States Patent [19]
Yun

[11] Patent Number: 5,953,066
[45] Date of Patent: Sep. 14, 1999

[54] BILINGUAL TELEVISION SIGNAL PROCESSOR

[75] Inventor: Hyung-Sik Yun, Seoul, Rep. of Korea

[73] Assignee: LG Semicon Co., Ltd., Cheongju, Rep. of Korea

[21] Appl. No.: 08/850,235

[22] Filed: May 2, 1997

[30]     Foreign Application Priority Data

May 21, 1996 [KR]   Rep. of Korea ...................... 96/17179

[51] Int. Cl.[6] ............................ H04N 7/08; H04N 7/084; H04N 7/087
[52] U.S. Cl. .......................... 348/485; 348/484; 348/480; 348/738; 348/736
[58] Field of Search .................................. 348/485, 484, 348/480, 481, 482, 483, 486, 738, 736, 737; H04N 7/08, 7/084, 7/087, 5/44, 5/60, 5/62

[56]              References Cited

U.S. PATENT DOCUMENTS

| | | |
|---|---|---|
| 4,139,866 | 2/1979 | Wegner . |
| 4,660,088 | 4/1987 | Lagoni et al. ........................... 348/738 |
| 4,747,140 | 5/1988 | Gibson .................................... 348/738 |
| 5,222,143 | 6/1993 | Min ......................................... 348/485 |

*Primary Examiner*—Nathan Flynn
*Assistant Examiner*—Vivek Srivastava
*Attorney, Agent, or Firm*—Fleshner & Kim

[57]              ABSTRACT

In a bilingual television signal processor which is capable of automatically controlling a bandpass filter for detecting a pilot signal included in a bilingual signal received in a television receiver having a bilingual function without an external adjustment, an improvement including a microcomputer for outputting an on-screen display message indicating a bilingual broadcasting and scanning the locked information of the pilot signal outputted from the PLL detector in a predetermined voltage range and step and outputting a corresponding pulse width modulated (PWM) signal, and a digital/analog (DA) converter for converting the PWM signal outputted from the microcomputer into an analog signal and outputting a corresponding DC voltage to set the bandpass filter, can achieve the effect that it can be controlled without an external adjustment since the voltage for adjusting the center frequency of the bandpass filter is scanned in an appropriate range, and as a result, the shift in the center frequency of the bandpass filter due to the variation of the temperature and the applied voltage can be prevented, and consequently, the exact setting of the center frequency and the detectability of the pilot signal can be significantly enhanced.

4 Claims, 2 Drawing Sheets

BILINGUAL TELEVISION SIGNAL PROCESSOR

BACKGROUND OF THE INVENTION

1. Field of the Invention

The present invention relates to a bilingual television signal processor, and more particularly, to an improved bilingual television signal processor which is capable of automatically controlling a pilot signal included in a bilingual signal received from a television having a bilingual function without an external adjustment.

2. Description of the Prior Art

Conventionally, as shown in FIG. 1, a bilingual television signal processor includes a main audio signal processor 130 for amplifying and FM(frequency demodulation)-detecting a main audio signal (MAS) carried on a carrier wave of 4.5 MHz to detect only a main audio signal, a sub audio signal processor 100 for detecting a sub audio signal (SAS) having a pilot signal included therein and carried on a carrier wave of 4.72 MHz through the same course as the main audio signal processor 130, a pilot signal detector 110 for filtering and detecting the sub audio signal outputted from the sub audio signal processor 100 to detect whether a present TV program is in a stereo or dual state or in neither state, a phase locked loop (hereinafter, called PLL) detector 120 for locking the pilot signal detected from the pilot signal detector 110 and outputting the locked information, a microcomputer 160 for outputting an on-screen display (OSD) message notifying a bilingual broadcasting on the television screen when the signal from the PLL detector 120 is outputted, a matrix unit 140 for selecting and outputting a mono type or a stereo type, a main audio unit or a sub audio unit in accordance with control signals (ctrl1,ctrl2) applied from a user by using the main audio signal and the sub audio signal detected from the main audio signal processor 130 and the sub audio signal processor 100, and a tone controller 150 for receiving an output from the matrix unit 140 to determine an output tone and output the same through a speaker.

The main audio signal processor 130 includes an amplifier 131 for amplifying the inputted main audio signal carried on the carrier wave of 4.5 MHz, and an FM-detector 132 for FM-detecting the amplified signal to detect a main audio signal. The sub audio signal processor 100 includes an amplifier 101 and an FM-detector 102 having the same functions as those of the main audio signal processor 130.

The pilot signal detector 110 includes a bandpass filter 11 for filtering the signals around the sub audio signal of 55 kHz outputted from the sub audio signal processor 100, and an AM(amplitude modulation)-detector 112 for detecting the signals outputted from the band filter 11 to detect a pilot signal. The PLL detector 120 includes a stereo PLL detector 121 and a dual PLL detector 122 for locking the pilot signal detected from the AM-detector 112.

The operation of the conventional bilingual television signal processor having the above-described construction will now be described.

The main audio signal (MAS) carried on the carrier wave of 4.5 MHz is inputted to the amplifier 131 of the main audio signal processor 130, amplified by a predetermined gain and inputted to the FM-detector 132. As a result, only the main audio signal is detected through the FM detection.

The sub audio signal (SAS) having the pilot signal included therein is carried on the carrier wave of 4.724 MHz to be inputted to the sub audio signal processor 100. The sub audio signal is detected through the same course as that of the main audio signal processor 130. The sub audio signal is inputted to the bandpass filter 111 of 55.069 kHz of the pilot signal detector 110 to filter the signals around 55 kHz and then a carrier wave of 55.069 kHz is detected by the AM-detector 112 to detect a pilot signal.

The pilot signal detected from the AM-detector 112 is inputted to the stereo PLL detector 121 and the dual PLL detector 122 of the PLL detector 120 and locked therein. The pilot signal locked in the PLL detector 120 and then outputted therefrom is inputted to the microcomputer 160, which outputs an on-screen display (OSD) message notifying a bilingual broadcast or a stereo broadcast on the television screen.

The main audio signal and the sub audio signal detected from the main audio signal processor 130 and the sub audio signal processor 100 are inputted to the matrix unit 140, which selects and outputs a mono type or a stereo type, a main audio signal or a sub audio signal as a desired output, in accordance with the control signals (ctrl1,ctrl2) applied by the user. The selected output signal is inputted to the tone controller 150 to determine an output tone and to be outputted to the outside through a speaker.

The bandpass filter 111 of the pilot signal detector 110 receives the sub audio signal outputted from the sub audio signal processor 100 and filters the frequencies around 55.069 kHZ in accordance with a central frequency adjusted by a DC voltage externally applied.

That is, the user must adjust the center frequency to be exactly 55.069 kHz, and for the general TV products, the center frequency is set using a variable resistance.

The bandpass filter of 55.069 kHz has a significantly high Q value to exactly detect the pilot signal carried on the carrier wave of 55.069 kHz and reject other frequencies to a maximum degree. In accordance with such high Q value, a center frequency of the band filter must be exactly adjusted externally.

However, in the conventional bilingual television signal processor, when the adjusted center frequency is out of the bandwidth of 55.069 kHz by around 3 dB, the detectability becomes lower, and a shift in the center frequency is generated by a change in the external DC voltage, resulting in lowering the detectability of the pilot signal and causing erroneous operation.

SUMMARY OF THE INVENTION

Accordingly, it is an object of the present invention to provide an improved bilingual television signal processor in which a center frequency of a bandpass filter is capable of being automatically adjusted in accordance with a pulse width modulation signal with respect to a detected pilot signal to enhance the detectability of a pilot signal.

To achieve the above object, in a bilingual television signal processor comprising a main audio signal processor for amplifying and frequency modulation(FM)-detecting a main audio signal carried on a carrier wave to detect only a main audio signal, a sub audio signal processor for amplifying and FM-detecting a sub audio signal having a pilot signal included therein and carried on another carrier wave, a pilot signal detector for filtering and detecting the sub audio signal outputted from the sub audio signal processor to detect a pilot signal, a phase locked loop (PLL) detector for locking the pilot signal detected by the pilot signal detector and outputting the locked signal, the improvement further includes a microcomputer including a pulse width modulation controller for scanning a locked information of a pilot signal outputted from the PLL detector in a predetermined range of voltage and a constant step and outputting a resultant pulse width modulated (PWM) signal, and a digital/analog (DA) converter for converting the PWM signal into an analog signal and outputting a corresponding DC voltage to a bandpass filter.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
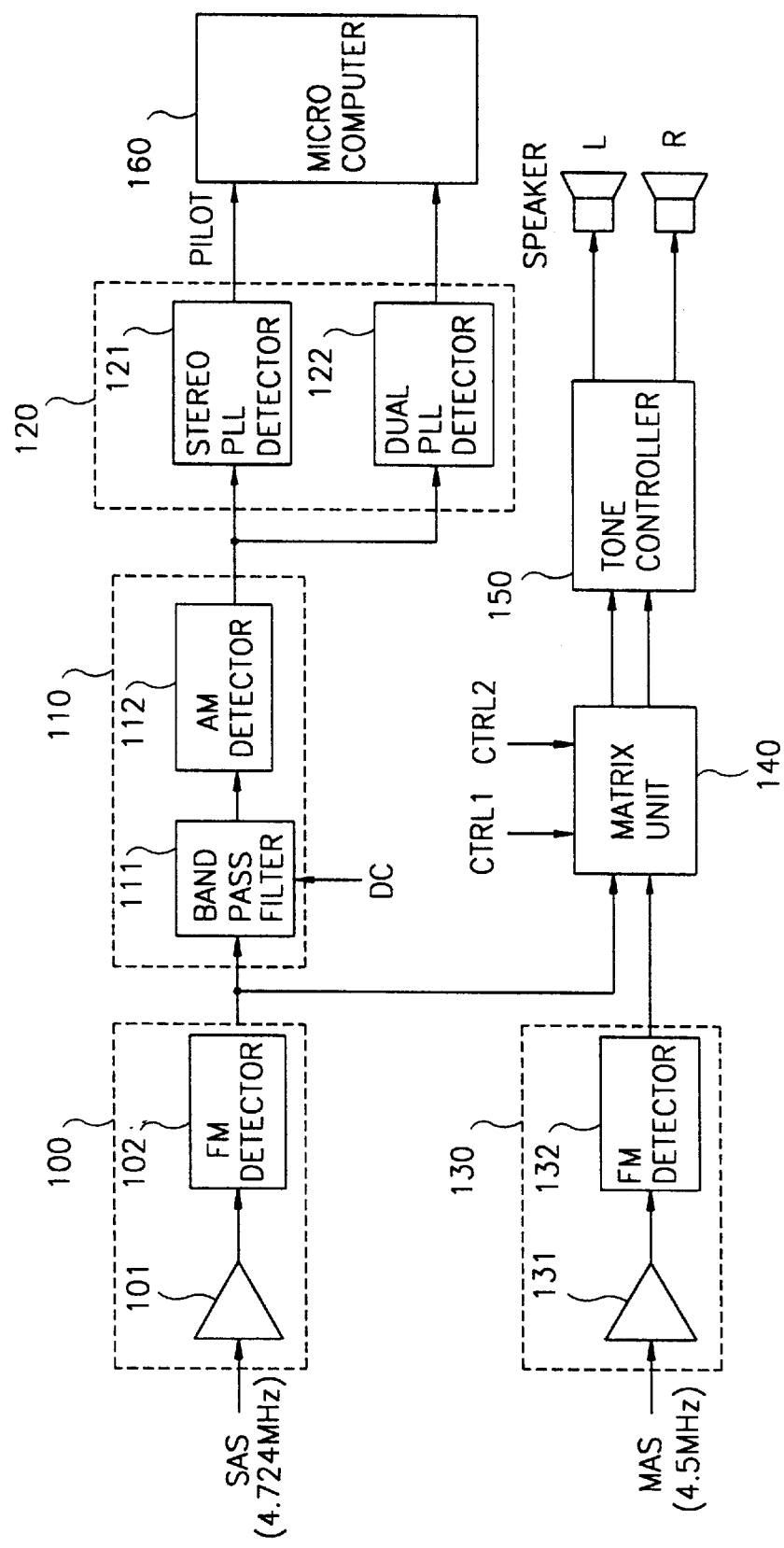
FIG. 1 is a block diagram of a bilingual television signal processor according to the conventional art.
Figure 2:
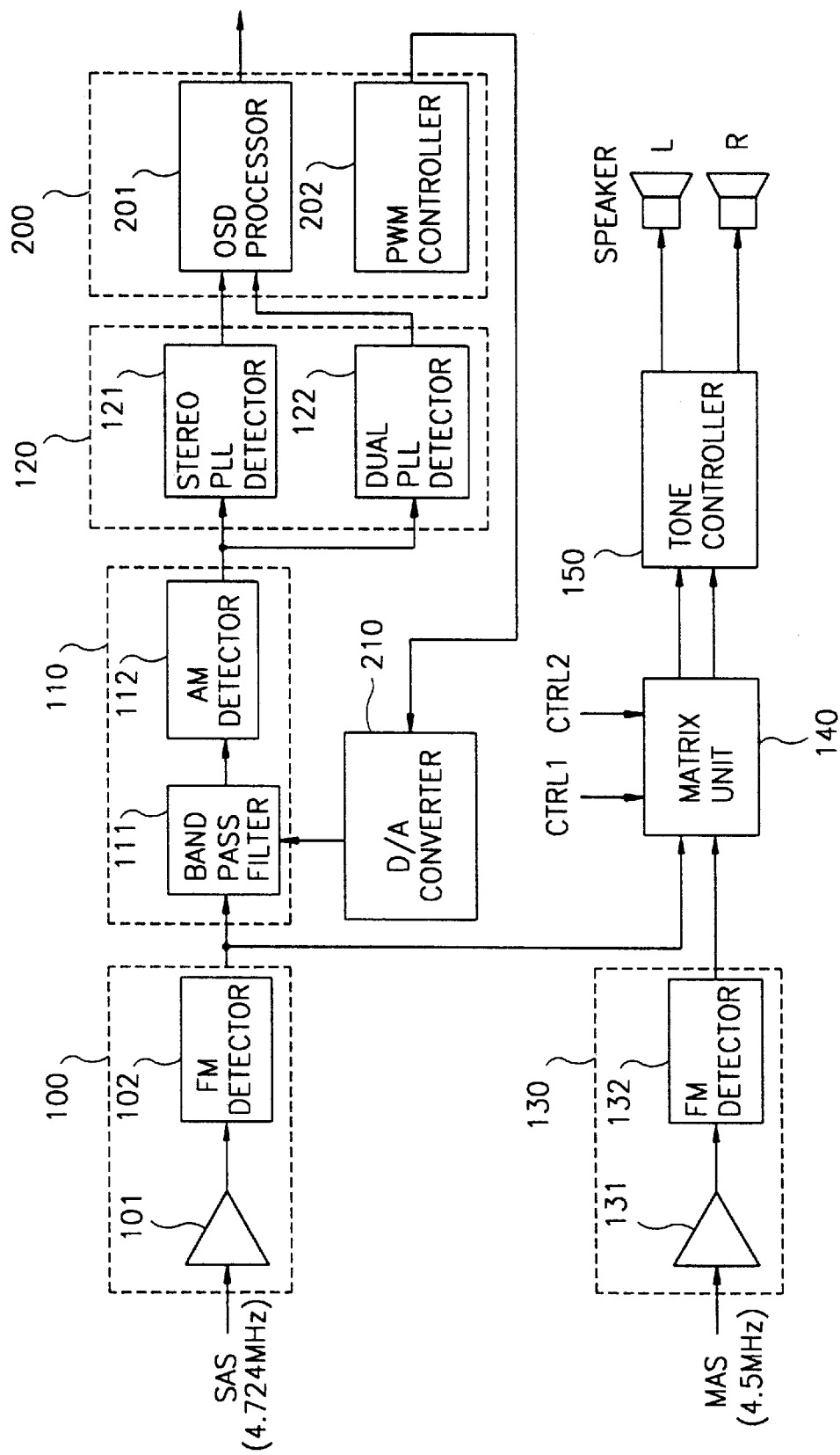
FIG. 2 is a block diagram of a bilingual television signal processor according to the present invention.

As shown in FIG. 2, in the bilingual television signal processor according to the present invention, the microcomputer 200 for outputting an on-screen display (OSD) message indicating a bilingual broadcasting on a television screen as in the microcomputer 100 of the conventional art, further outputs a pulse width modulation (hereinafter, called PWM) signal in accordance with a locked information of the pilot signal locked in the PLL detector 120, and a digital/analog (hereinafter, called DA) converter 210 is provided for converting the PWM signal outputted from the microcomputer 200 into an analog signal and outputting a corresponding DC voltage to control the center frequency of the bandpass filter 111. The same reference numerals denote the same elements as those of the conventional art.

The microcomputer 200 includes an on-screen display processor 201 for outputting the OSD message indicating a bilingual broadcast on the TV screen in accordance with a locked information of the pilot signal outputted from the PLL detector 120, and a PWM controller 202 for scanning a locked information of a pilot signal outputted from the PLL detector 120 in a predetermined range of voltage and a constant step and outputting a resultant pulse width modulated (PWM) signal so that a center frequency of the bandpass filter 111 can be adjusted.

The operation and effect of the bilingual television signal processor according to the present invention having the above construction will now be described in detail with reference to FIG. 2.

The sub audio signal having the pilot signal included therein outputted from the sub audio signal processor 100 is inputted to the bandpass filter 111 of the pilot signal detector 110, and then the band pass filter 111 filters the sub audio signal in accordance with a center frequency of an initial passband frequency (ωc) adjusted by receiving a predetermined initial PWM signal in the form of DC voltage from the PWM controller 202 of the microcomputer 200 via the DA converter 210.

When the initially adjusted center frequency is adjusted out of the range of 55.069 kHz, an output from the bandpass filter 111 does not appear, and as a result, the PLL detector 120 does not output the thusly locked signal. Therefore, the on-screen display controller 201 of the microcomputer 200 does not display the on-screen display message notifying the bilingual broadcast on the screen.

The PWM controller 202 of the microcomputer 200 receives the output from the PLL detector 120 so as to adjust the center frequency of the bandpass filter 111 by outputting the corresponding PWM signal. The thusly outputted PWM signal is inputted to the DA converter 210 and converted into a DC voltage.

The thusly converted DC voltage is applied to the bandpass filter 11 to adjust the center frequency.

The bilingual television signal processor according to the present invention repeatedly carries out the above-described procedure.

The above-described performance taken as an example will now be described in detail.

If the center frequency of the bandpass filter 111 is adjustable by a voltage ranging from 1V to 2V and the passband frequency (ωc) is 54~56 kHz, the predetermined initial passband frequency (ωc) set by the PWM controller 202 of the microcomputer 200 is 54 kHz, and the corresponding adjustment voltage applied to the bandpass filter 111 is 1V.

Accordingly, the PWM controller 202 initially outputs a PWM signal corresponding to 1V so that the adjustment voltage becomes 1V, and the PWM signal is converted into a DC voltage of 1V by the DA converter 210 to be applied to the bandpass filter 111.

The FM-detected sub audio signal initially outputted to the bandpass filter 111 is processed in the pilot signal detector 110 and the PLL detector 121, but since the PLL detector 121 outputs no signal, that is, it is not locked, when the PWM controller 202 of the microcomputer 200 modulates the pulse width by as much as variation amount of a pre-programmed duty cycle and outputs the same, the DA converter 210 converts the output into a DC voltage to output to the bandpass filter 111, which is repeatedly carried out.

When a pilot signal is detected by the PLL detector 120 while the PWM operation ranging from 1 to 2V is performed on the DC voltage thusly applied to the bandpass filter 111, the PWM controller 202 continues outputting the previous PWM signal without change.

That is, if the pilot signal is not locked when the voltage of 1V is applied to the bandpass filter 111 at first, the PWM controller 202 keeps scanning to 1V+ΔVstep, 1V+2ΔVstep, . . . . Then, when the bandpass filter 111 is locked at 1V+Vlock, the output from the PWM controller 202 of the microcomputer 200 is fixed so that the DC voltage is not changed any more and kept to be 1V+Vlock.

However, when the scanning is carried out in the range of 1V~2V and results in no locked signal, it is the case that the bilingual broadcasting is not performed, and therefore the detection of the pilot signal is stopped.

The above-described operation is performed on changing or ascertaining a channel, and the scanning range of 1V~2V or ΔVstep is set in consideration of the range or step that the scanning for detecting the pilot signal is carried out within a predetermined time for on-screen display when changing or ascertaining a channel.

As described in detail above, the present invention can be controlled without an external adjustment since the voltage for adjusting the center frequency of the bandpass filter is scanned in an appropriate range, and as a result, the shift in the center frequency of the bandpass filter caused by the variation of the temperature and the applied voltage can be prevented. Consequently, the exact setting of the center frequency and the detectability of the pilot signal can be significantly enhanced.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a bilingual television signal processor comprising a main audio signal processor for amplifying and frequency modulation(FM)-detecting a main audio signal carried on a carrier wave to detect only a main audio signal, a sub audio signal processor for amplifying and FM-detecting a sub audio signal having a pilot signal included therein and carried on another carrier wave, a pilot signal detector for filtering and detecting the sub audio signal outputted from the sub audio signal processor to detect a pilot signal, a phase locked loop (PLL) detector for locking the pilot signal detected by the pilot signal detector and outputting the locked signal, the improvement further comprises:

a microcomputer for outputting an on-screen display message and a pulse width modulated (PWM) signal in accordance with the locked information of the pilot signal locked in the PLL detector; and a digital/analog (DA) converter for converting the PWM signal outputted from the microcomputer into an analog signal and outputting a corresponding DC voltage to a bandpass filter of the pilot signal detector.

2. The processor of claim 1, wherein the microcomputer comprises:

an on-screen display processor for outputting the on-screen display message in accordance with the pilot signal outputted from the PLL detector; and a PWM controller for scanning a locked information of a pilot signal outputted from the PLL detector in a predetermined range of voltage and a constant step and outputting a resultant pulse width modulated (PWM) signal so that a center frequency of the bandpass filter can be adjusted.

3. The processor of claim 2, wherein a predetermined voltage range and step of the PWM controller are set.

4. The processor of claim 1, wherein the microcomputer keeps outputting a previous PWM signal, when a pilot signal is detected by the PLL detector.

* * * * *